US011893326B2

(12) United States Patent
Daware et al.

(10) Patent No.: US 11,893,326 B2
(45) Date of Patent: Feb. 6, 2024

(54) SYSTEMS AND METHODS FOR GENERATING MOLDED PARTS COMPRISING REINFORCED COMPOSITE MATERIALS

(71) Applicant: Tata Consultancy Services Limited, Mumbai (IN)

(72) Inventors: Santosh Vasant Daware, Pune (IN); Sooriyan Senguttuvan, Pune (IN); Soban Babu Beemaraj, Pune (IN); Rizwan Khan Pathan, Pune (IN); Yagnik Pravinchandra Kalariya, Pune (IN); Amit Gangadhar Salvi, Pune (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 469 days.

(21) Appl. No.: 17/175,463

(22) Filed: Feb. 12, 2021

(65) Prior Publication Data
US 2022/0108053 A1   Apr. 7, 2022

(30) Foreign Application Priority Data

Oct. 7, 2020   (IN) .............................. 202021043660

(51) Int. Cl.
*G06F 30/23*   (2020.01)
*G06N 20/00*   (2019.01)
(Continued)

(52) U.S. Cl.
CPC .............. *G06F 30/23* (2020.01); *G06F 30/27* (2020.01); *G06N 20/00* (2019.01); *G06T 17/20* (2013.01);
(Continued)

(58) Field of Classification Search
CPC ...... G06F 30/23; G06F 30/27; G06F 2119/18; G06F 2113/26; G06N 20/00; G06T 17/20
See application file for complete search history.

(56) References Cited

U.S. PATENT DOCUMENTS 5,940,309 A * 8/1999 White ..................... G06F 30/23
703/7
2018/0319046 A1 * 11/2018 Johnson .............. B29C 35/0288

OTHER PUBLICATIONS

Yin, Fei et al. "A hybrid of back propagation neural network and genetic algorithm for optimization of injection molding process parameters", Elsevier, Materials and Design 32 (2011), 3457-3464 (Year: 2011).*

(Continued)

*Primary Examiner* — Brian S Cook
*Assistant Examiner* — Edward P Picton
(74) *Attorney, Agent, or Firm* — FINNEGAN, HENDERSON, FARABOW, GARRETT & DUNNER LLP

(57) ABSTRACT

Conventionally, manufacturing of molded parts using composite materials has led to poor dimensional accuracy and tensile strength due to improper curing thus resulting in rejection or early/premature failure of composite part. Embodiments of the present disclosure provide simulation-based systems and methods for manufacturing/generating molded parts using reinforced composite materials. The optimized cure cycle is computed for a given component without carrying out numerous experiments. The present disclosure implements multiscale method and surrogate modeling in virtual testing for more accurate and faster manufacturing of molded parts. Process parameters for specified qualities (e.g., minimum residual stresses, minimum deformation, etc.) required for a part are determined along with least process manufacturing time. The resulting optimized time dependent cure cycle for each thermal zone (Continued)

of the heated mold is transferred to a master controller (e.g., system) which controls the entire curing processes with the use of feedback control.

12 Claims, 10 Drawing Sheets

(51) Int. Cl.
    *G06F 30/27*     (2020.01)
    *G06T 17/20*     (2006.01)
    *G06F 119/18*     (2020.01)
    *G06F 113/26*     (2020.01)

(52) U.S. Cl.
    CPC ...... *G06F 2113/26* (2020.01); *G06F 2119/18* (2020.01)

(56) References Cited

OTHER PUBLICATIONS

Li, Min et al. "Optimal Curing for Thermoset Matrix Composites: Thermochemical Considerations", Wiley, Polymer Composites vol. 22 (2001), 118-131 (Year: 2001).*

Tifkitsisa, K.I. et al., "Stochastic multi-objective optimisation of the cure process of thick laminates", Applied Science and Manufacturing, Sep. 2018, vol. 112, pp. 383-394 Elsevier, Https://dspace.lib.cranfield.ac.uk/bitstream/handle/1826/13351/cure_process_of_thick_laminates-2018.pdf;jsessionid=C10C221A91B09D33565582DC8743441B?sequence=1.

Xiao, Hong et al., "A Sensitivity Analysis-Based Parameter Optimization Framework for 3D". Printing of Continuous Carbon Fiber/Epoxy Composites, Prevention and treatment information (HHS), 2019, NCBI, https://www.mdpi.com/1996-1944/12/23/3961.

Struzziero, G. et al., "Numerical optimisation of thermoset composites manufacturing processes: A review", Materials Science—Composites Part A—applied Science and Manufacturing, 2019, vol. 124, Semantic Scholar, https://dspace.lib.cranfield.ac.uk/bitstream/handle/1826/14383/Numerical_optimisation_of_thermoset_composites-2019.pdf?sequence=4.

Pfrommer, Julius et al., "Optimisation of manufacturing process parameters using deep neural networks as surrogate models", Journal & Book, 2018, vol. 72, pp. 426-431, Elsevier, https://www.researchgate.net/publication/323607624_Optimisation_of_manufacturing_process_parameters_using_deep_neural_networks_as_surrogate_models/link/5a9fce27a6fdcc22e2cbeb21/download.

* cited by examiner

SYSTEMS AND METHODS FOR GENERATING MOLDED PARTS COMPRISING REINFORCED COMPOSITE MATERIALS

PRIORITY CLAIM

The U.S. patent application claims priority under 35 U.S.C. § 119 to: India Application No. 202021043660, filed in India on Oct. 7, 2020. The entire contents of the aforementioned application are incorporated herein by reference.

TECHNICAL FIELD

The disclosure herein generally relates to reinforced composite materials, and, more particularly, to systems and methods for generating/manufacturing molded parts comprising reinforced composite materials.

BACKGROUND

Composite materials, as the name suggests, are made up of one or more materials with distinct phases and recognizable interfaces organized in a specific geometric order so that they provide desired material properties. They are made up of reinforcing material (Carbon, Glass, Kevlar, nano clay, ceramics, etc.) in the form of particles or fibers embedded in a binding matrix material (polymer, metal, concrete or ceramic). Fiber reinforced polymer matrix composites are increasingly used in aerospace, defense, transportation, energy sectors, and the like. These composite materials are highly hierarchical in nature and consist of polymer and fibers in the form of multiple architectures at multiple length scales. The resulting microstructures and interaction of these constituent materials control their mechanical, thermal, and other physical properties. During the manufacturing process, heat is applied to composite material which causes the shrinkage in polymer matrix due to thermal effects or cure effects or both depending on the type of polymer e.g., thermoset and thermoplastic used. Thus, the dimensional accuracy and final properties of the composite components also depend on the manufacturing process and need to be analyzed carefully along with process and its parameters.

Thermoset polymers, commonly referred as resins, when subjected to cure temperature cycle, undergo exothermic transformation and form cross linking bonds. During this process, the resin experiences cure shrinkage along with evolution of mechanical, thermal, and other physical properties which directly impact the performance of an end product. In composites, the reinforcements such as fibers affects the cure process due to heat transfer between fibers and resin and so the properties of the part post manufacturing also depend on the properties of reinforcing fiber materials (such as conductivity, coefficient of thermal expansion, Young's modulus, etc.) as well as their architecture (such as unidirectional, cross-ply, woven, etc.). The part geometry (such as thickness variations, ply orientations, corners, insert, holes, etc.) also plays a strong role in the final structural response of the end product. If the cure of resin during manufacturing is not handled properly, then the resulting part may have distortions as well as residual stresses. The distortion caused during manufacturing, results in the rejection of the part due to poor dimensional fidelity. The residual stresses in the post cured part result in lowering of ultimate strength of the component resulting in premature failure. In certain cases, the component may come out damaged after the cure process.

Currently, the analysis of curing of components made up of composite materials is highly experiment driven. The resin cure cycle offered by the resin manufacturers for virgin resin are typically used in curing of composite components without taking fibers and their architectures as well as the component geometry into account. This usually results in residual stresses as well geometric distortions. Therefore, component manufacturers are needed to carry out more tests on sample components for a variety of cure cycles and examine the resulting components for distortions. This is a very expensive and time-consuming process, especially in the case of large composite structures such as aircraft wings and wind turbine blades, which does not guarantee the best cure cycle for the components. Also, it is very difficult to measure the residual stresses inside the component experimentally and usually requires many destructive and non-destructive tests.

Manufacturing composite components in aerospace, automotive as well as energy sector demand different requirements. Aerospace components need to be of the highest quality without any process induced deformation and damage, hence it takes considerable amount of time and care while manufacturing those components. Automotive components are needed to be manufactured in large volume in shortest of time possible with least amount of residual stresses to improve toughness. Wind turbine blades are of extremely large size and undergo large fatigue loads. The manufacturing of these blades needs to be carried out carefully to reduce the residual stresses and deformations, without expensive manufacturing process, to achieve durability. Also, the size effects associated with such large composite structures make the overall strengths very sensitive to local defects and therefore needs to be carefully considered. Thus, depending on the requirements of the industry, suitable materials and a manufacturing process with proper process equipment must be selected that suits the quality, size and volume of the components required.

SUMMARY

Embodiments of the present disclosure present technological improvements as solutions to one or more of the above-mentioned technical problems recognized by the inventors in conventional systems. influencing input parameters and (ii) other parameters from the one or more input parameters based on an associated sensitivity to obtain one or more objective functions; configuring, using the one or more objective functions, an optimization problem to correlate the one or more input parameters and the one or more objective functions; iteratively performing, for the optimization problem, an optimization technique on (i) the one or more most influencing input parameters and (ii) other parameters from the one or more input parameters based on an associated sensitivity to obtain a set of optimized process cycle parameters, until output of the optimization technique reaches a termination criterion; determining and defining one or more temperature profiles using the set of optimized process cycle parameters; and generating/manufacturing a molded part using the composite material based on the one or more determined temperature profiles.

In an embodiment, the composite material is a particulate reinforcement, or a fibre reinforcement embedded with a polymer material.

In an embodiment, the one or more objective functions comprise at least one of a residual stress, a process time, deformation, a failure index, degree of cure, total thermal energy spent on a heating process.

In an embodiment, the termination criterion is one of a number of maximum iterations the optimization technique is to be performed, or output of the optimization technique reaches a value associated with the one or more objective functions.

In an embodiment, the optimization technique is at least one of a Genetic Algorithm (GA), a particle swarm optimization technique, a differential evolution algorithm, an artificial bee colony algorithm, a covariance matrix adaptation evolution strategy algorithm, a DIRECT (Dividing RECTangles) algorithm, and a gradient-based algorithm.

In another aspect, there is a processor implemented simulation system for generating/manufacturing molded parts using composite materials. The system comprises a memory storing instructions; one or more communication interfaces; and one or more hardware processors coupled to the memory via the one or more communication interfaces, wherein the one or more hardware processors are configured by the instructions to: obtain an input data comprising design of experiments (DoE) that is specific to composite material, wherein the design of experiments (DoE) comprises a correlation between one or more input parameters and one or more corresponding output parameters; generate a machine learning (ML) model using the design of experiments (DoE); perform a global sensitivity analysis on the design of experiments (DoE) to identify one or more most influencing parameters from the one or more input parameters of the design of experiments (DoE); configure a finite element analysis (FEA) with the ML model embedded within the FEA using (i) the most influencing input parameters and (ii) other parameters from the one or more input parameters based on an associated sensitivity to obtain one or more objective functions; configure, using the one or more objective functions, an optimization problem to correlate the one or more input parameters and the one or more objective functions; iteratively perform, for the optimization problem, an optimization technique on (i) the one or more most influencing input parameters and (ii) other parameters from the one or more input parameters based on an associated sensitivity to obtain a set of optimized process cycle parameters, until output of the optimization technique reaches a termination criterion; determine and define one or more temperature profiles using the set of optimized process cycle parameters; and generate/manufacture a molded part using the composite material based on the one or more determined temperature profiles.

In an embodiment, the composite material is a particulate reinforcement, or a fibre reinforcement embedded with a polymer material.

In an embodiment, the one or more objective functions comprise at least one of a residual stress, a process time, deformation, a failure index, degree of cure, total thermal energy spent on a heating process.

In an embodiment, the termination criterion is one of a number of maximum iterations the optimization technique is to be performed, or output of the optimization technique reaches a value associated with the one or more objective functions.

In an embodiment, the optimization technique is at least one of a Genetic Algorithm (GA), a particle swarm optimization technique, a differential evolution algorithm, an artificial bee colony algorithm, a covariance matrix adaptation evolution strategy algorithm, a Dividing RECTangles (DIRECT) algorithm, and a gradient-based algorithm.

In yet another aspect, there is provided a computer program product comprising a non-transitory computer readable medium having a computer readable program embodied therein, wherein the computer readable program, when executed on a computing device causes the computing device to generate/manufacture molded parts using composite materials by obtaining an input data comprising design of experiments (DoE) that is specific to composite material, wherein the design of experiments (DoE) comprises a correlation between one or more input parameters and one or more corresponding output parameters; generating a machine learning (ML) model using the design of experiments (DoE); performing a global sensitivity analysis on the design of experiments to identify one or more most influencing parameters from the one or more input parameters of the design of experiments (DoE); configuring a finite element analysis (FEA) with the ML model embedded within the FEA using (i) the most influencing input parameters and (ii) other parameters from the one or more input parameters based on an associated sensitivity to obtain one or more objective functions; configuring, using the one or more objective functions, an optimization problem to correlate the one or more input parameters and the one or more objective functions; iteratively performing, for the optimization problem, an optimization technique on (i) the one or more most influencing input parameters and (ii) other parameters from the one or more input parameters based on an associated sensitivity to obtain a set of optimized process cycle parameters, until output of the optimization technique reaches a termination criterion; determining and defining one or more temperature profiles using the set of optimized process cycle parameters; and generating/manufacturing a molded part using the composite material based on the one or more determined temperature profiles.

In an embodiment, the composite material is a particulate reinforcement, or a fiber reinforcement embedded with a polymer material.

In an embodiment, the one or more objective functions comprise at least one of a residual stress, a process time, deformation, a failure index, degree of cure, total thermal energy spent on a heating process.

In an embodiment, the termination criterion is one of a number of maximum iterations the optimization technique is to be performed, or output of the optimization technique reaches a value associated with the one or more objective functions.

In an embodiment, the optimization technique is at least one of a Genetic Algorithm (GA), a particle swarm optimization technique, a differential evolution algorithm, an artificial bee colony algorithm, a covariance matrix adaptation evolution strategy algorithm, a Dividing RECTangles (DIRECT) algorithm, and a gradient-based algorithm.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
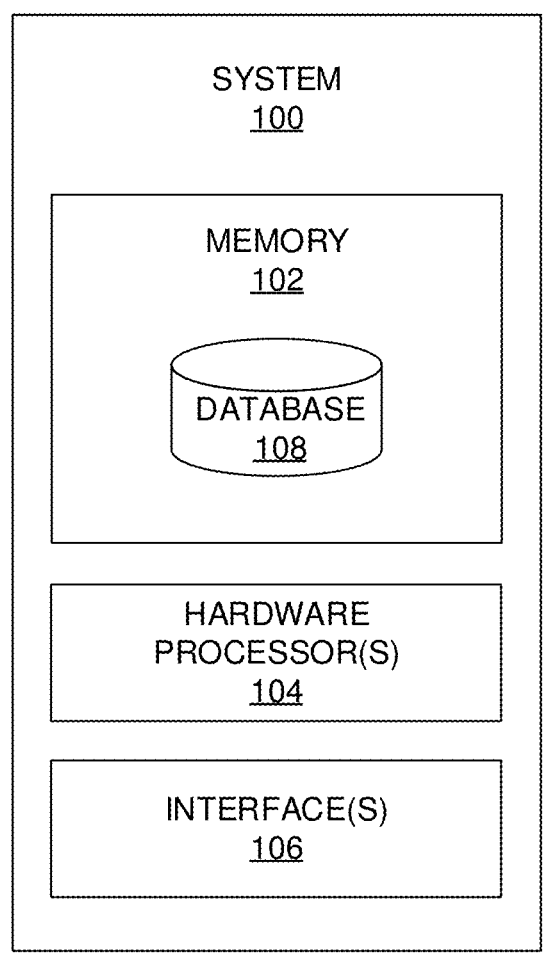
FIG. 1 depicts a system for generating molded parts comprising reinforced composite materials, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Composite materials are ubiquitous, used in wide variety of industries such as aerospace, automobile, and defense, because of their superior mechanical properties such as high specific strength and stiffness. The properties of composite materials can be optimized or tailored through the appropriate selection of its constituents, their relative proportion (volume fraction), and architecture (geometry, distribution, and orientation of reinforcing elements) at multiple length scales. This also gives the composite material its hierarchical, heterogeneous, and anisotropic behavior. For scalable production, variety of polymers (thermoset or thermoplastic) and reinforcements are available for composites. Moreover, the ability to tailor the composite materials according to the product requirements adds another dimension of material design in conventional product design process. Currently, the material selection and design are made via rule of thumb and prior experience and in some extreme cases by trial and error.

Resin manufacturers provide thermal, chemical, and mechanical properties (e.g., glass transition temperature, density, tensile strength, Young's modulus) of resin measured through experiments by carrying out tests as per the ASTM or ISO standards in a controlled environment. The specimens are manufactured in a controlled environment in a laboratory setup. A number of these experiments are carried out, and the properties are then consolidated with their mean and scatter values. These properties differ significantly in the final manufactured part as they are used in combination with fibers, for different geometry (of the component), and are made in large numbers in varying environmental conditions (temperature, humidity, etc.) with different manufacturing processes and equipment. Therefore, these properties are usually used in the design of composite structures along with their uncertainties through safety factors. Finally, structural performance is predicted. The manufacturer uses his experience and technical data sheets of materials to plan the manufacturing and thermal cure cycles. Therefore, there is a need to determine the quality of the component for a given curing cycle as well as design optimal process parameters and process strategies to manufacture components of the desired quality. It helps to formalize the decision making in manufacturing and integrates manufacturing with product design and material selection.

Conventionally, autoclaves have been used to cure the resin, which is costly in terms of capital investment and provides less process control. Size of the composite part that can be processed in autoclave are also limited. Recently, out of autoclave, vacuum assisted resin infusion process has gained a momentum in various industries. However, this process needs more control with respect to the resin cure kinetics. Traditionally, a constant amount of heat is supplied to different zones of the prepreg composite parts to cure the resin which leads to thermal gradients in zones having thickness gradient. As a result, parts with variable thickness have variable degrees of cure for given temperature at given time. This often leads to non-uniform curing resulting in high residual stresses that can cause failure of composite part. Therefore, it is required to design the cure temperature cycle of various zones of the composite part according to the material used and the geometrical aspects of the corresponding zone to get minimal thermal gradients and subsequent residual stresses.

Embodiments of the present disclosure provide systems and methods for generating (or manufacturing) molded parts using reinforced composite materials. More specifically, the method of the present disclosure details a manufacturing process that first computes the most optimized cure cycle computationally for a given component without carrying out numerous physical experiments and then transfers it to the thermally controlled mold used for curing. For a faster optimization, virtual testing is combined with multiscale method and it is used to carry out cure kinetics based thermo-chemical-mechanical analysis on micro-scale model of the composite material. This is then linked to higher length scale models up to component level using surrogate model. The use of multi-scale method and surrogate model in virtual testing makes the entire digital process more accurate and faster. Then, an optimizer, with the developed virtual test setup of component level cure analysis, is used to find out process parameters for the user specified qualities (such as minimum residual stresses, minimum deformation, etc.) required for the end product with least process manufacturing time. The resulting optimized time dependent cure cycle for each thermal zone of the heated mold is transferred to a master controller (e.g., the system 100) of the manufacturing setup which controls the entire curing processes with the use of feedback control.

Referring now to the drawings and more particularly to FIGS. 1 through 8, where similar reference characters denote corresponding features consistently throughout the figures, there are shown preferred embodiments and these embodiments are described in the context of the following exemplary system and/or method.

FIG. 1 depicts a system 100 for generating molded parts comprising reinforced composite materials, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting several devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises design of experiments (DoE) that is specific to composite material, wherein the DoE comprises a correlation between one or more input parameters and one or more corresponding output parameters. The database 108 further stores one or more most influencing parameters for a specific composite material based on DoE, one or more objective functions, optimization problems, optimized process cycle parameters, one or more temperature profiles, molded parts information, and the like.

The information stored in the database 108 further comprises one or more machine learning (ML) models (e.g., surrogate models) as known in the art, that are generated using the DoE, analysis technique(s) such as global sensitivity analysis technique, finite element analysis technique, optimization technique(s), and the like. The above-mentioned techniques comprised in the memory 102/database 108 are invoked as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
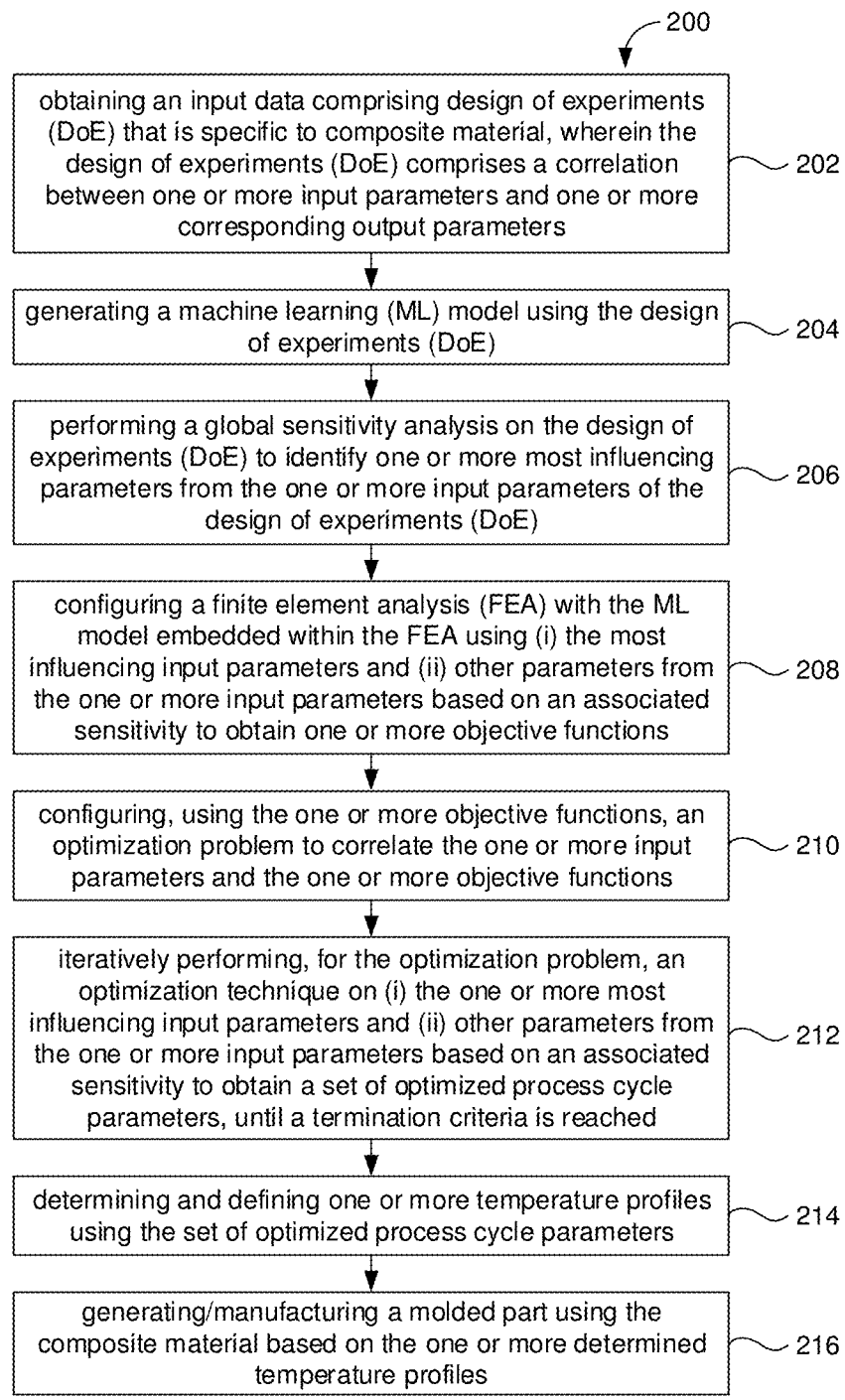
FIG. 2 depicts an exemplary flow chart illustrating a method for generating molded parts comprising reinforced composite materials, using the system of FIG. 1, in accordance with an embodiment of the present disclosure.

FIG. 2, with reference to FIG. 1, depicts an exemplary flow chart illustrating a method for generating molded parts comprising reinforced composite materials, using the system 100 of FIG. 1, in accordance with an embodiment of the present disclosure. In an embodiment, the system(s) 100 comprises one or more data storage devices or the memory 102, operatively coupled to the one or more hardware processors 104 and configured to store instructions for the execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 obtain an input data comprising design of experiments (DoE) that is specific to composite material. The composite material is a particulate or fiber reinforcement embedded with a polymer material, in one example embodiment of the present disclosure. In one embodiment of the present disclosure, the polymer material is at least one of a thermoset polymer, and a thermoplastic polymer. In an embodiment, the expression 'fiber' may be referred as 'fibre' and interchangeably used herein. The hierarchical nature of composite materials along with the shrinkage effect found in resin due to cure kinetics and thermal effects needs to be studied at micro scale and its effects should be scaled up to component level through multiscale approach and homogenization methods. In the present disclosure, for better understanding of the embodiments and the systems and methods described herein, a simple unidirectional composite laminate of carbon fibers embedded in epoxy resin has been considered. The design of experiments (DoE) comprises a correlation between one or more input parameters and one or more corresponding output parameters specific to one or more tests/experiments conducted for the composite material. In the present disclosure, it is to be noted that sufficient data of various evolving material properties and residual stresses with respect to degree of cure and temperature is required and is obtained by changing temperature as per cure cycle through the design of experiments (DoE). In the present disclosure, DoE is conducted using one or more sampling techniques such as a Latin Hypercube sampling (LHS) method as known in the art. Latin hypercube sampling is a statistical method for generating a near-random sample of parameter values from a multidimensional distribution. The design of experiments (DoE) with this sampling method is used to conduct computer experiments with virtual test setup of cure analysis for composite material at micro-level through FEA. It is to be understood by a person having ordinary skill in the art or person skilled in the art that the sampling technique such as Latin Hypercube sampling method to perform design of experiments (DoE) shall not be construed as limiting the scope of the present disclosure and any other sample technique such Quasi Monte-Carlo sampling technique, orthogonal array sampling technique, Hammersley sequence sampling technique, uniform sampling technique, and the like can be utilized by the system and method of the present disclosure. For the study/experiments by the present disclosure, approximately 500 experiments are performed with the control parameters such as h, c, $T_h$, and $t_2$ with same bounds as used in the setup of optimization problem.

More specifically, as a part of FEA analysis at micro-scale for curing, thermo-chemical analysis is carried out on Representative Volume Element (RVE) to study cure kinetics and its effects on homogenized properties of composite materials by system and method of the present disclosure. The temperature cycle, defined through the four mentioned DoE parameters, is applied to all sides of the RVE as temperature boundary condition. The extracted time history of the degree of cure and temperature is passed on to structural analysis. The evolving resin properties and cure shrinkage effects are changed according to the degree of cure. Also, the thermal effects are included in the structural analysis. For structural analysis, all sides of the RVE are constrained to get the combined response of cure shrinkage and thermal effects in terms of stresses. This response is then homogenized to use it for next material scale through surrogate models. The frequency for the extraction of data points (residual stresses and corresponding degree of cure and temperature) is kept as 10s in each experiment performed through FEA. Additional linear perturbation analysis is carried out to get the homogenized structural properties of the composite material with respect to evolving degree of cure for a lamina. Below, Table 1 depicts exemplary DoE comprising a correlation between the one or more input parameters and the one or more corresponding output parameters specific to the composite material.

TABLE 1

| Input | Output |
|---|---|
| 1. Process parameters of the temperature cycle with bounds<br>a. Heating rate: [0.1, 0.25] K/s<br>b. Dwell temperature: [300, 350] K<br>c. Dwell time: [2500, 4200] s<br>d. Cooling rate: [0.1, 0.25] K/s<br>2. Number of sample points: 500<br>3. Sampling method: Latin Hypercube Sampling (LHS)<br>4. Experiment: Virtual test setup for composite material to conduct cure analysis and linear perturbation analysis at micro-scale through FEA<br>5. Material properties of the constituents (resin and fiber) | 1. Extracted data to create surrogate models for homogenized material properties and residual stresses<br>2. Extracted data to conduct sensitivity analysis of various process parameters |

Figure 3A:
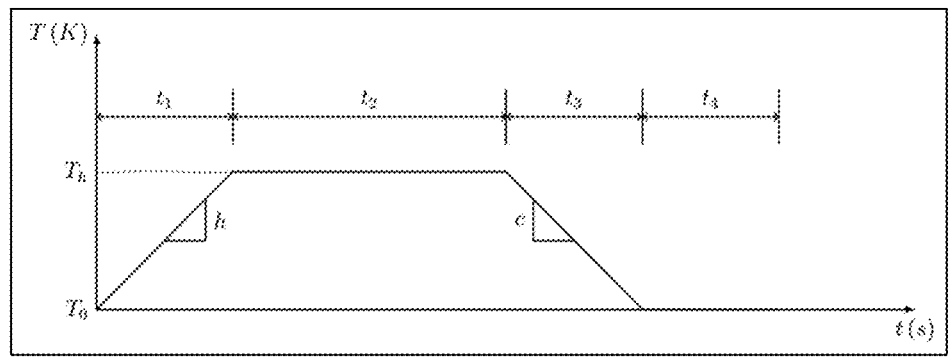
FIG. 3A depicts type of temperature cycle used for curing for the optimization problem, in accordance with an embodiment of the present disclosure.
Figure 3B:
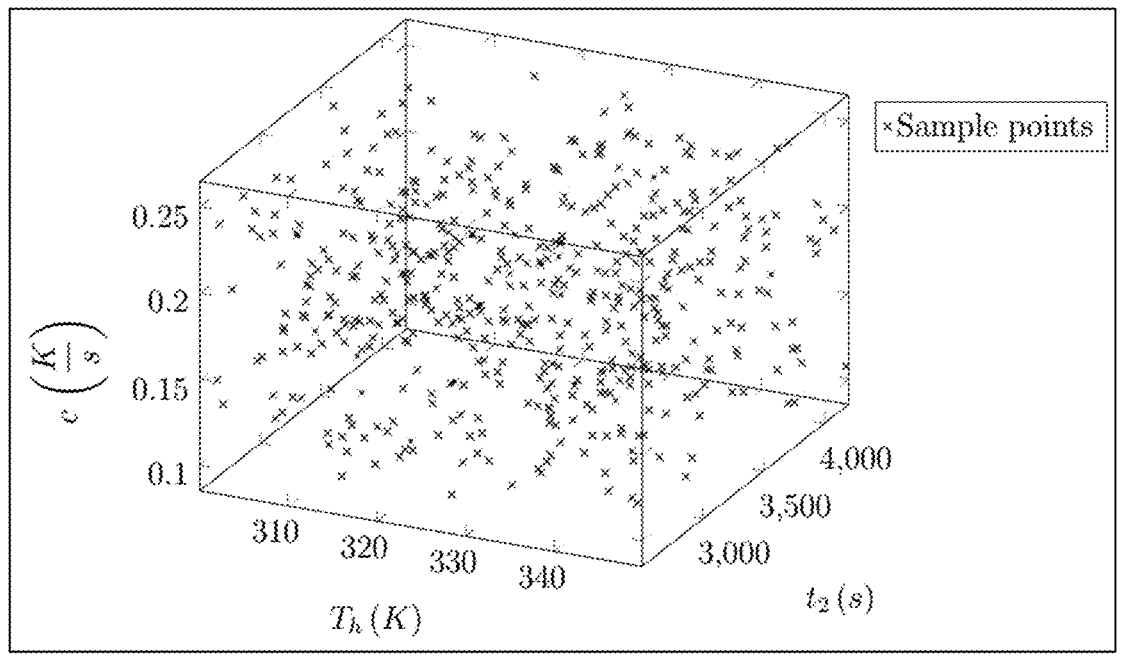
FIG. 3B depicts a three-dimensional (3D) Latin Hypercube Sampling (LHS) size of 500, in accordance with an example embodiment of the present disclosure.

FIG. 3A depicts the type of temperature cycle used for heating during the cure process in the current exemplary problem. It consists of ramp up from room temperature, dwell at elevated temperature, ramp down to room temperature and dwell at room temperature. This whole temperature cycle is parameterized through five process parameters, heating rate (h), cooling rate (c), dwell temperature ($T_h$), dwell period ($t_2$) and total cure time. The total cure time is kept constant as 5400 s for the current exemplary problem. The rest of the parameters are selected as process parameters to optimize and the same are chosen for DoE with same bounds as of optimization problem. FIG. 3A depicts type of temperature cycle used for curing for the optimization problem, in accordance with an embodiment of the present disclosure. FIG. 3B, with reference to FIGS. 1 and 3A, depicts a three-dimensional (3D) Latin Hypercube Sampling (LHS) size of 500, in accordance with an example embodiment of the present disclosure.

Figure 4A:
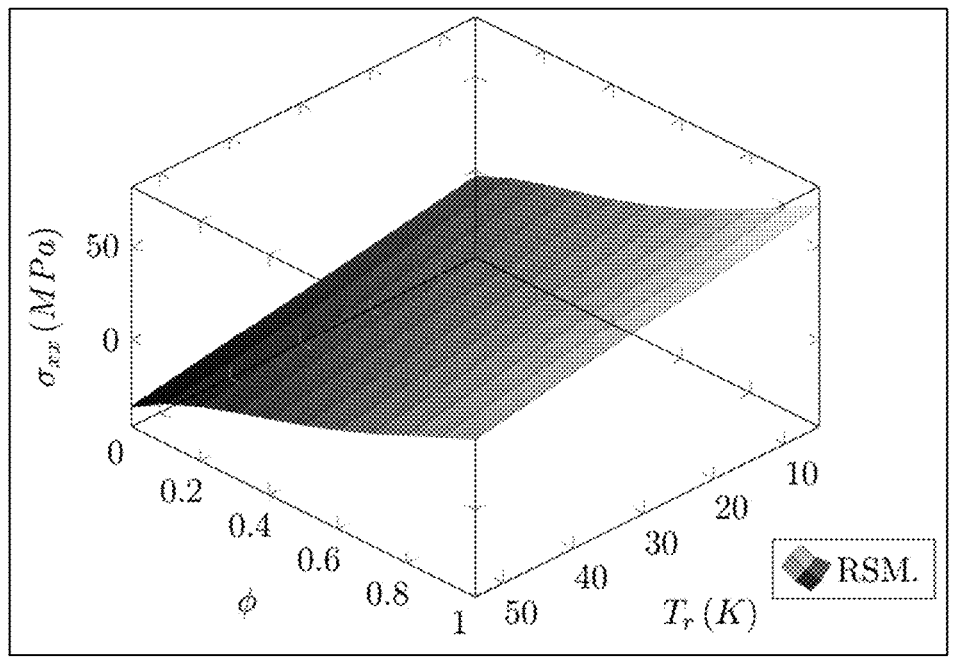
FIG. 4A depict a surrogate model indicative of a response surface model of longitudinal stress $\sigma_{xx}$ (MPa), as a function of relative cure temperature $T_r(K)$ and degree of cure $\phi$, in accordance with an example embodiment of the present disclosure.
Figure 4B:
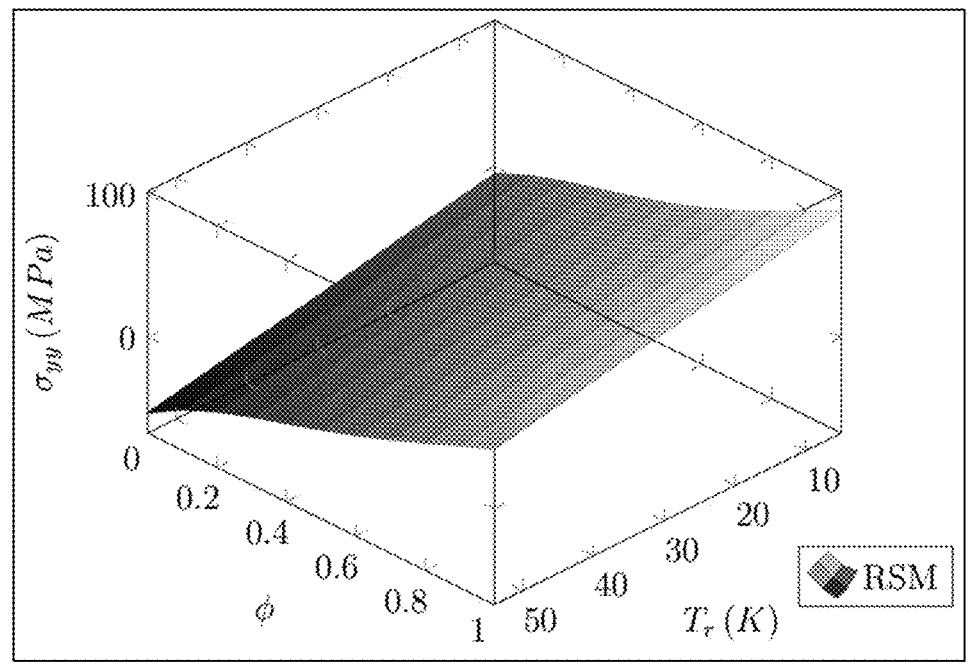
FIG. 4B depict a surrogate model indicative of a response surface model of transverse stress $\sigma_{xx}$ (MPa), as a function of relative cure temperature $T_r(K)$ and degree of cure $\phi$, in accordance with an example embodiment of the present disclosure.
Figure 5A:
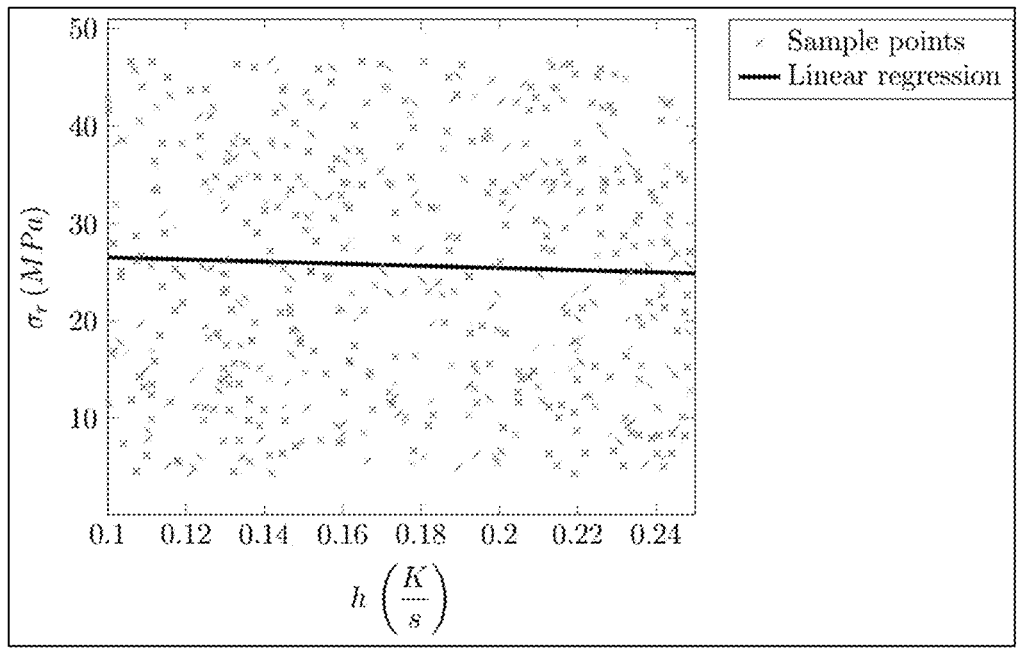
FIGS. 5A through 5D depict graphical representations illustrating global sensitivity of residual stress $\sigma_r$ (MPa) with respect to cure cycle parameters, in accordance with an embodiment of the present disclosure.
Figure 5B:
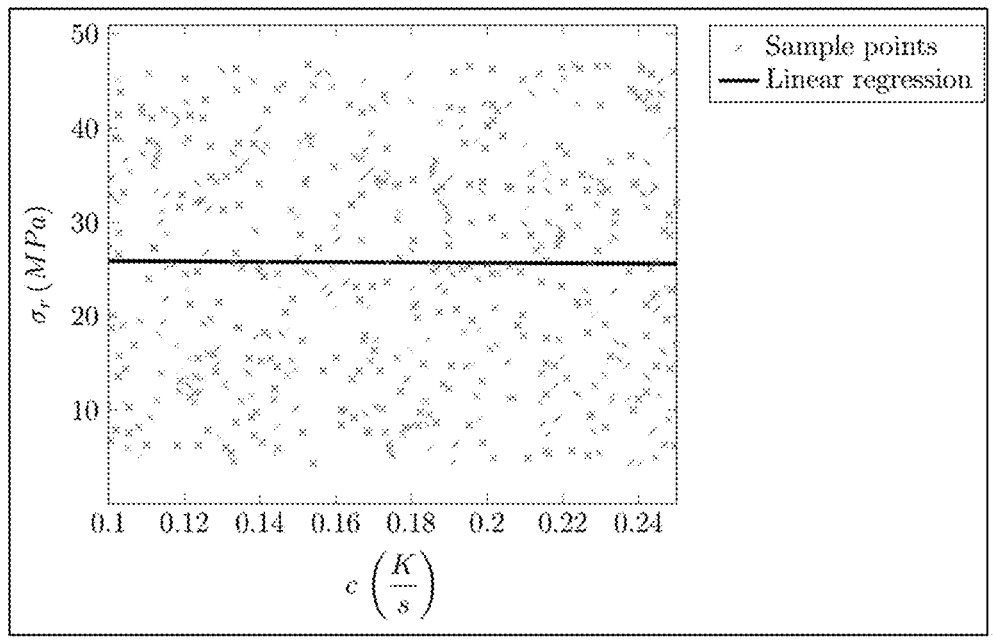
Figure 5C:
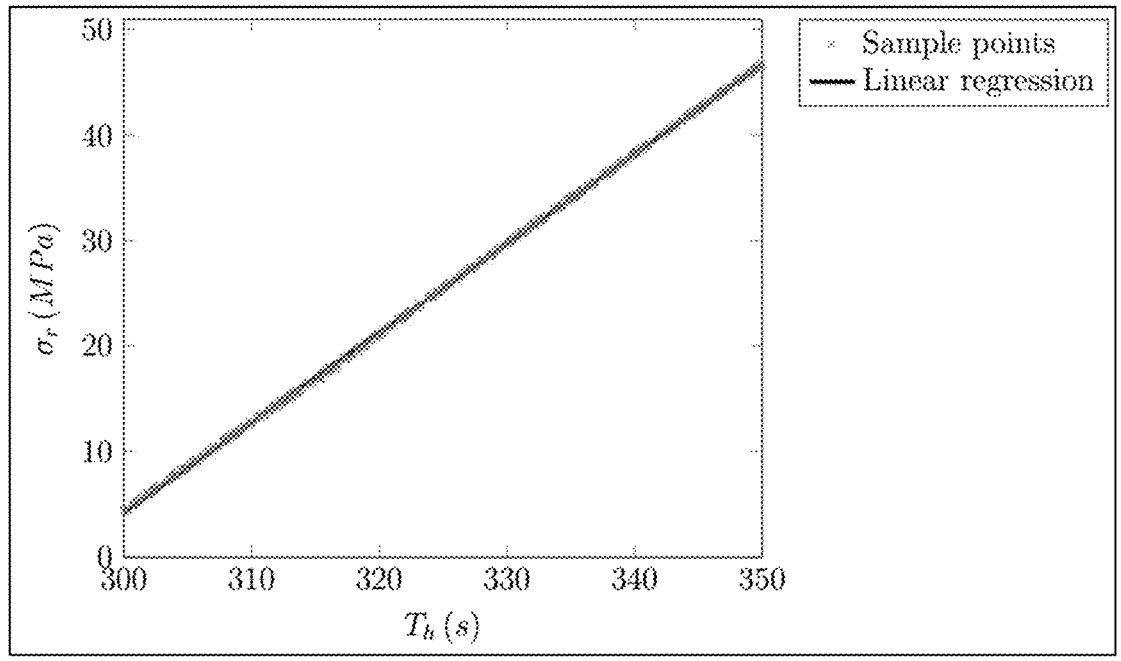
Figure 5D:
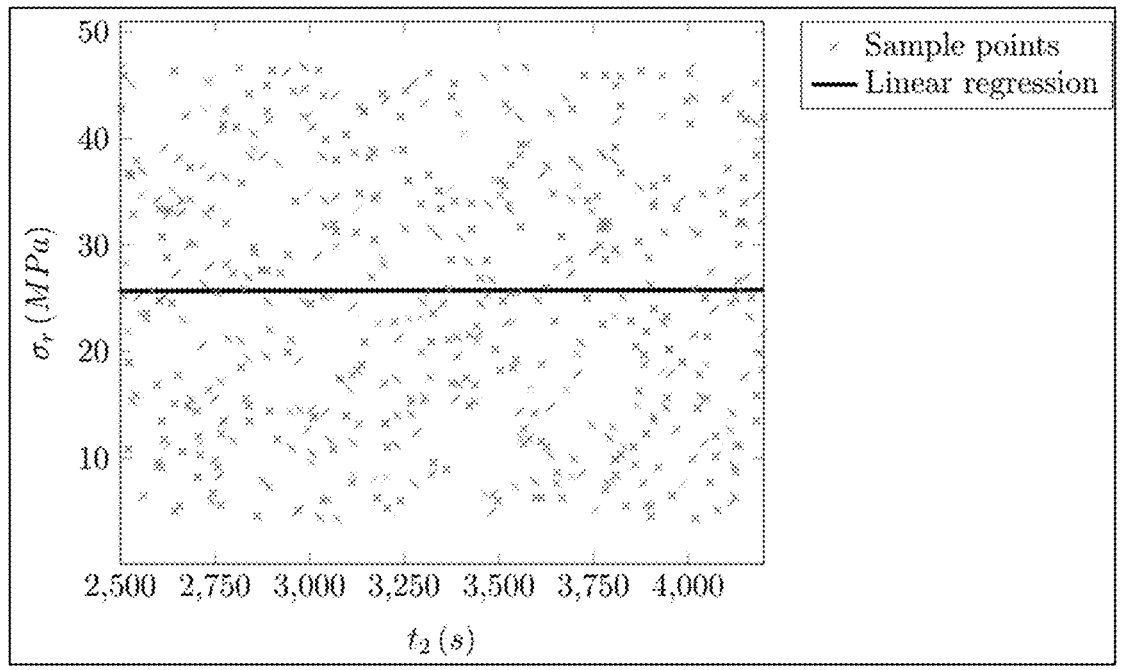
Figure 6A:
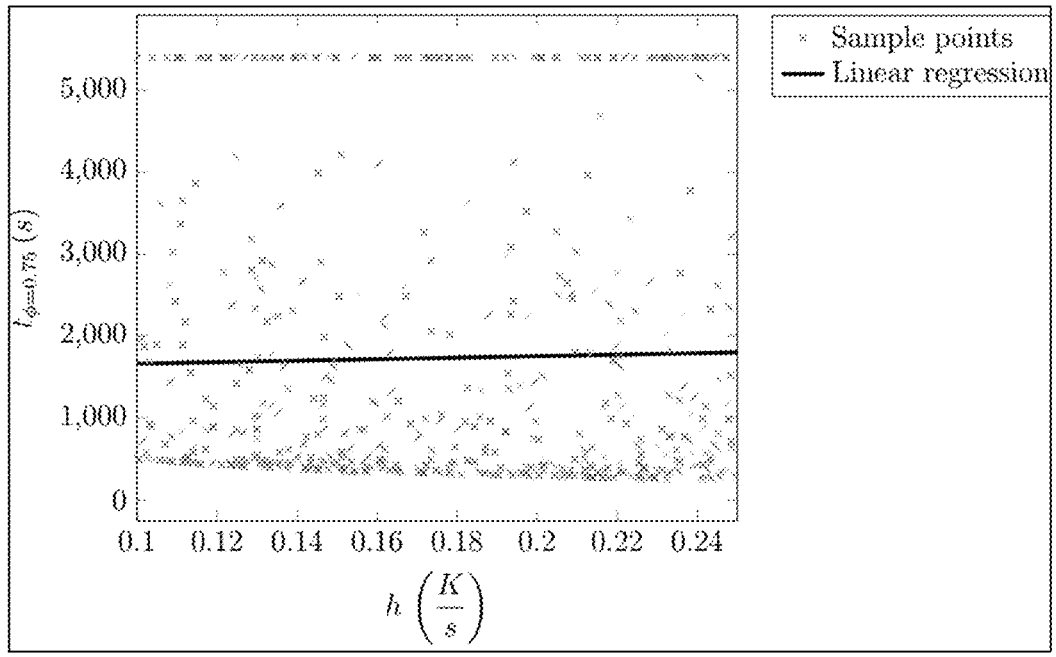
FIGS. 6A through 6D depict graphical representations illustrating global sensitivity of process time at which the degree of cure reaches 0.75 ($t_{\phi=0.75}$), corresponding to the cure cycle parameters, in accordance with an embodiment of the present disclosure.
Figure 6B:
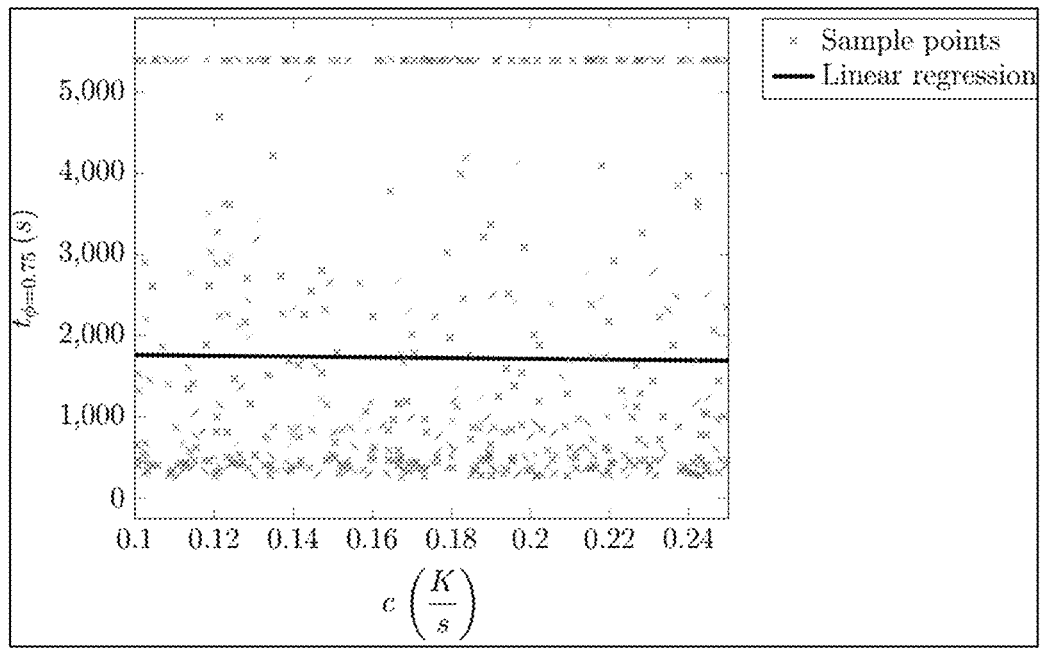
Figure 6C:
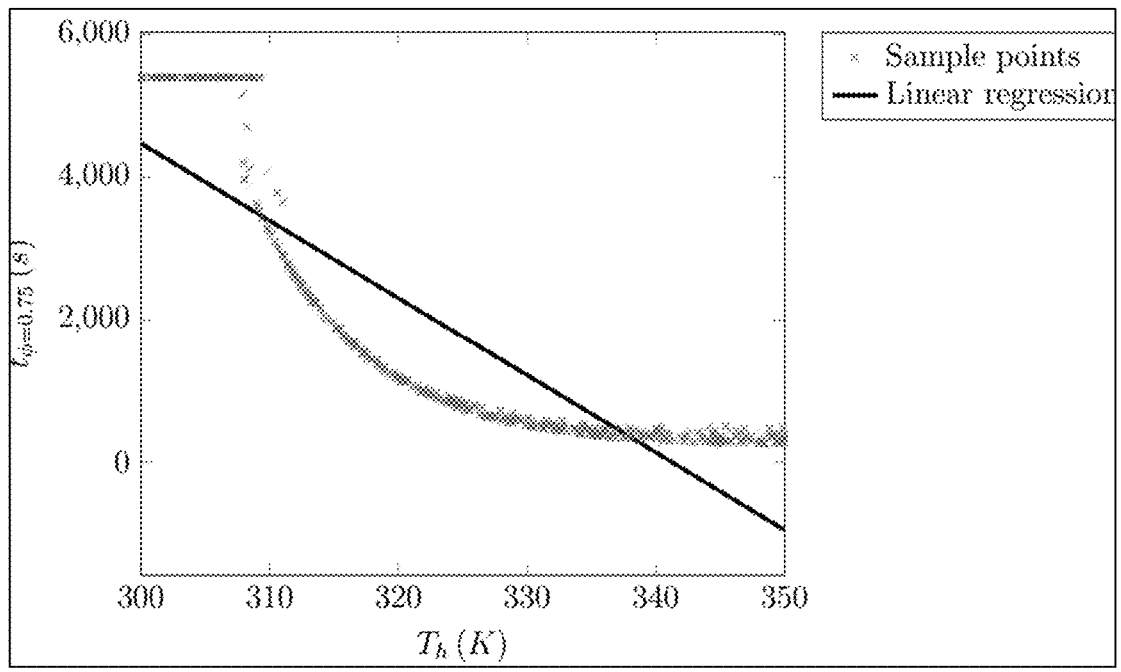
Figure 6D:
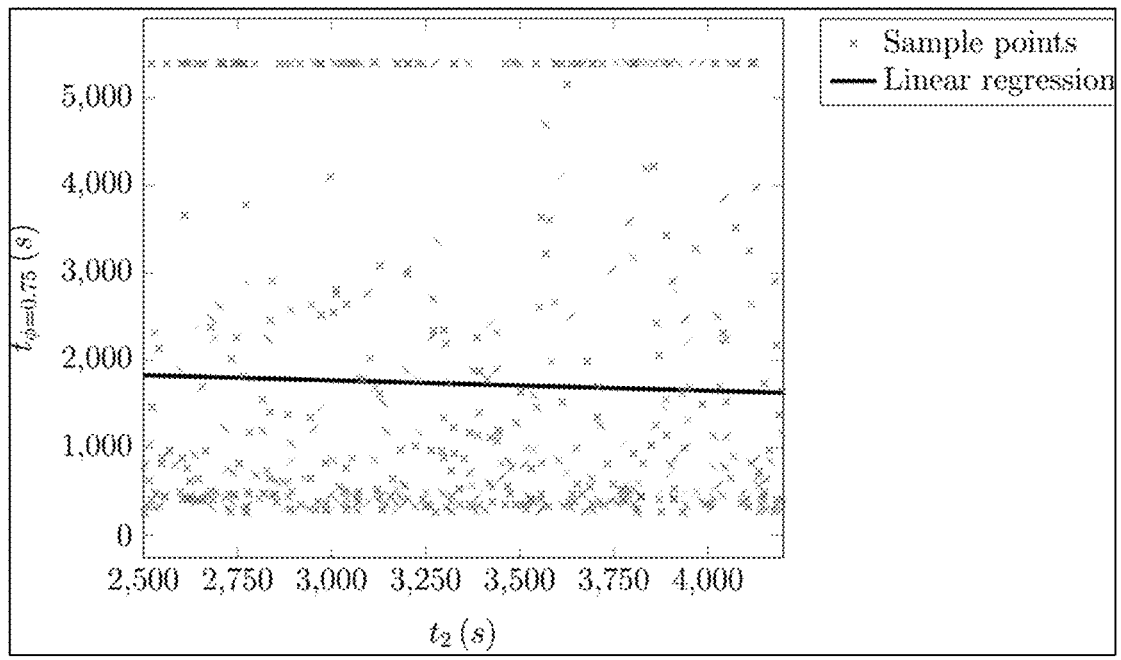

At step 204 of the present disclosure, the one or more hardware processors 104 generate a machine learning (ML) model using the data extracted through the design of experiments (DoE). The ML model generated at step 204 is also referred as a surrogate model in the present disclosure and interchangeably used herein. Once sufficient data is collected, surrogate model algorithm is used to create response surface models. FIGS. 4A and 4B depict surrogate modeling for axial and transverse residual stresses of unidirectional lamina. More specifically, FIG. 4A, with reference to FIGS. 1 through 3C, depict a surrogate model indicative of a response surface model of longitudinal stress $\sigma_{xx}$ (MPa) as a function of relative cure temperature $T_r$(K), and degree of cure $\phi$, in accordance with an example embodiment of the present disclosure. FIG. 4B, with reference to FIGS. 1 through 4A, depict a surrogate model indicative of a response surface model of transverse stress $\sigma_{yy}$(MPa) as a function of cure temperature $T_r$(K), and degree of cure $\phi$, in accordance with an example embodiment of the present disclosure.

The surrogate model, as depicted in FIGS. 4A and 4B, is expressed by way of the following exemplary expressions:

$$\sigma xx = 90.18\phi - 175.7\phi^2 + 285.9\phi^3 - 126\phi^4 - 0.66T_r + 0.67T_r\phi - 1.04T_r\phi^2 + 0.34T_r\phi^3$$

$$\sigma_{yy} = 121.26\phi - 220.6\phi^2 + 331.29\phi^3 - 139.02\phi^4 - 0.98T_r + 0.83T_r\phi - 1.07T_r\phi^2 + 0.27T_r\phi^3$$

where $T_r = T - T_0$

As can be seen from the above expressions/equations, responsive surface based polynomial equations are used here as a surrogate model but any other linear, non-linear, tree based, neural network based surrogate model method or technique can be used and implemented by the system and method of the present disclosure and such implementation of surrogate model shall not be construed as limiting the scope of the present disclosure. Like residual stresses, surrogate models for other material properties such as Young's modulus, Shear modulus, Poisson's ratio, etc. are generated with respect to degree of cure and/or temperature in a similar manner from the extracted data of DoE.

At step 206 of the present disclosure, the one or more hardware processors 104 perform a global sensitivity analysis on the design of experiments (DoE) to identify one or more most influencing parameters from the one or more input parameters of the design of experiments. In the present disclosure, dwell temperature $T_h$(K) and dwell time $t_2$(s) are determined to be the most influencing parameters from the one or more input parameters of the design of experiments, in one example embodiment.

Sensitivity analyses are a measure of the influence of input parameter variance on output response functions. The global sensitivity study is performed by the system and method of the present disclosure. Global sensitivity shows trends in the response functions as the input parameter varies. Global sensitivity analysis is useful when model behaviour is not known. Global sensitivity is measured through any of the following indices: Pearson's correlation coefficient, standard regression coefficient, partial correlation coefficient, and Sobol indices. For simplicity, Pearson's correlation coefficient $\rho_{x_i,f_i}$ (see equation (1)) is used to measure the sensitivity of input parameters, $x_i$, on the response functions, $f_i$, and visualized through scatter plot and regression lines (alternatively Spearman Rank correlation can be used, and such a correlation coefficient shall not be construed as limiting the scope of the present disclosure). Based on the correlation coefficients values, input parameters are ranked. Parameter with the highest correlation coefficient is given more mutation percentage in the subsequent steps of the method of the present disclosure.

$$\rho_{x_i, f_i} = \frac{COV(x_i, f_i)}{S_{x_i} S_{f_i}}$$

where, COV( ) is covariance and s is sample standard deviation (1)

The output response functions chosen for global sensitivity analysis are equivalent residual stress ($\sigma_r$) and process time at which the degree of cure reaches 0.75 ($t_{\varnothing=0.75}$). The equivalent residual stress is calculated as per von Mises criterion. It should be noted that any other criterion such as Tresca or Rankine theory can be used to calculate the equivalent stress as suitable to the problem in hand. The other output response function, $t_{\varnothing=0.75}$ is chosen instead of the time when the part gets completely cured to avoid the disqualification of satisfactory solution because of possible incomplete cure at the end of the process. It is evident from Table 3 that dwell temperature ($T_h$) affects the residual stress ($\sigma_r$) more, where an increase in dwell temperature causes more residual stress due to a strong positive correlation coefficient. Then the dwell time ($t_2$) shows lesser effect on residual stress due to a small correlation coefficient. Heating and cooling rate have insignificant effect on residual stress. It should be noted that dwell temperature affects the time at which degree of cure reaches 75% ($t_{\phi=0.75}$) more with a negative correlation coefficient. The dwell time shows negligible effect on cure time with small correlation coefficient. Heating and cooling rates also have an insignificant effect on $t_{\phi=0.75}$. Table 3 also shows that there is a strong negative correlation between residual stress and $t_{\phi=0.75}$. This shows that the two objective functions are strongly conflicting in nature. Thus, one cannot be improved without degrading the other. In the next steps of the method (e.g., optimization), importance is given to the dwell temperature and time rather than on heating and cooling rate. More specifically, Table 2 depicts simple correlation metrics for all the input parameters and output response functions.

TABLE 2

| i | $\rho_{i, h}$ | $\rho_{i, c}$ | $\rho_{i, T_h}$ | $\rho_{i, t_2}$ | $\rho_{i, \sigma_r}$ | $\rho_{i, t_\phi-0.75}$ |
|---|---|---|---|---|---|---|
| $\sigma_r$ | 6.6 × 10⁻⁴ | 2.4 × 10⁻³ | 9.9 × 10⁻¹ | 4.1 × 10⁻³ | 1 × 10⁰ | 8.7 × 10⁻¹ |
| $t_{\phi-0.75}$ | −1.7 × 10⁻² | −1.2 × 10⁻² | −8.7 × 10⁻¹ | −1.9 × 10⁻² | −8.7 × 10⁻¹ | 1.0 × 10⁰ |

FIGS. 5A through 5D, with reference to FIGS. 1 through 4B, depict graphical representations illustrating global sensitivity of residual stress $\sigma_r$ (MPa) with respect to cure cycle parameters, in accordance with an embodiment of the present disclosure. FIGS. 6A through 6D, with reference to FIGS. 1 through 5D, depict graphical representations illustrating global sensitivity of process time at which the degree of cure reaches 0.75 ($t_{\phi=0.75}$), corresponding to the cure cycle parameters. It can be observed that, at step 206, the input to the system 100 is residual stress and the corresponding process parameters (e.g., refer FIGS. 5A through 6D); and the output by the system is the ranking of process parameters based on the correlation coefficient.

Figure 8:
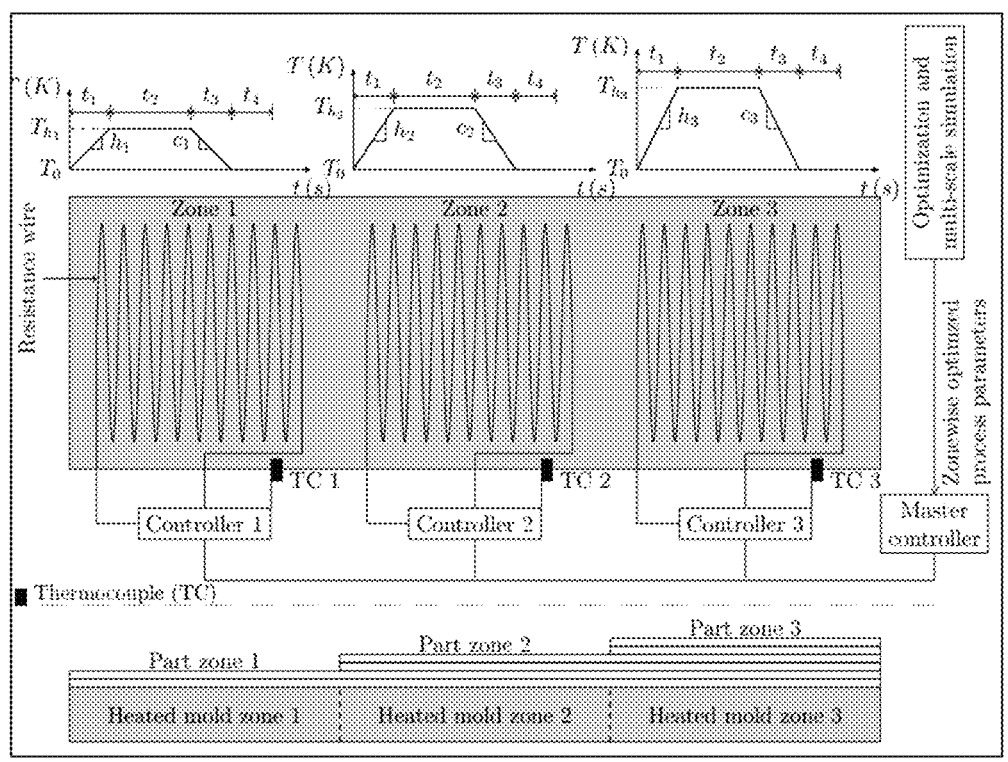
FIG. 8, with reference to FIGS. 1 through 7B, depicts an automated manufacturing setup with multiple zones arrangement for manufacturing/generating the molded part using the composite material based on the one or more determined temperature profiles determined by configuring the finite element analysis for the same manufacturing setup and then iteratively performing an optimization technique, in accordance with an embodiment of the present disclosure.

At step 208 of the present disclosure, the one or more hardware processors 104 configure/setup a finite element analysis (FEA) with the ML model(s) embedded within the FEA/inside the FEA for material modeling using (i) the most influencing input parameters and (ii) other parameters from the one or more input parameters based on an associated sensitivity to obtain one or more objective functions. In the present disclosure, dwell temperature $T_h(K)$ and dwell time $t_2(s)$ are determined to be the most influencing parameters from the one or more input parameters of the design of experiments, in one example embodiment. In an embodiment, remaining parameters as depicted in Table 1 and serving as input parameters are considered/determined to be the other parameters from the one or more input parameters. For instance, in the present disclosure, remaining parameters determined as other parameters include, but are not limited to, heating rate: [0.1, 0.25] K/s (Kelvin per second), Cooling rate: [0.1, 0.25] K/s, Number of sample points: 500, Sampling method: Latin Hypercube Sampling (LHS), Experiment: Virtual test setup for microscale to conduct cure analysis and linear perturbation analysis through FEA, material properties of constituents (e.g., resin and fiber), and the like. The above step may be better understood by the following description provided through an example. Along with the material, the geometrical aspects of the parts such as shape, size, thickness, ply stack up also affects the residual stress distribution inside the part made of composite material. It is necessary to include the effects of all these geometrical aspects in analyzing and optimizing the manufacturing process parameters. As explained earlier, it may be required to divide the part into multiple zones according to the geometrical aspects to reduce thermal gradients and optimize the process parameters for each zone individually as shown in FIG. 8. wherein a panel is divided into three zones according to thickness. Finite element analysis is setup for this panel with three determined zones with separate sets of process parameters for each zone. The machine learning models created are used in the finite element(s) analysis for material modeling. The use of these models for material modeling makes the FEA analysis faster and efficient compared to an explicit multi-scale framework. Below, Table 3 depicts the input to the system 100 of FIG. 1 wherein FEA is performed to derive one or more outputs.

TABLE 3

| Input | Output |
|---|---|
| 1. Polynomial surrogate models of residual stress (Above equations) | 1. Residual stress |
| | 2. Residual strain |
| | 3. Deformation |
| 2. Homogenized composite properties | 4. Degree of cure |
| | 5. Failure |
| 3. Component dimensions, | |
| 4. Process parameters | |

Figure 7A:
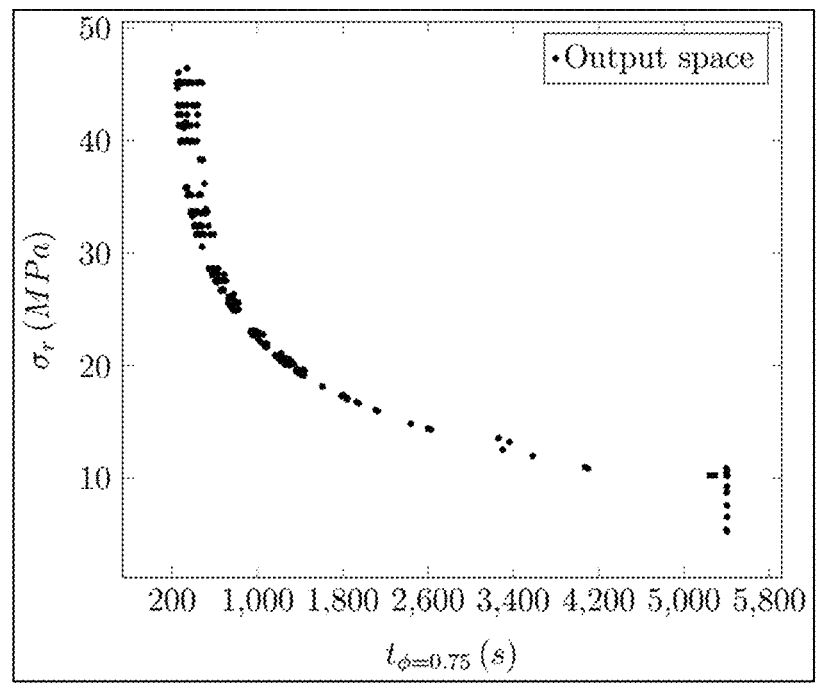
FIG. 7A depicts a graphical representation illustrating objective function space of cure process derived through FEA, in accordance with an embodiment of the present disclosure.
Figure 7B:
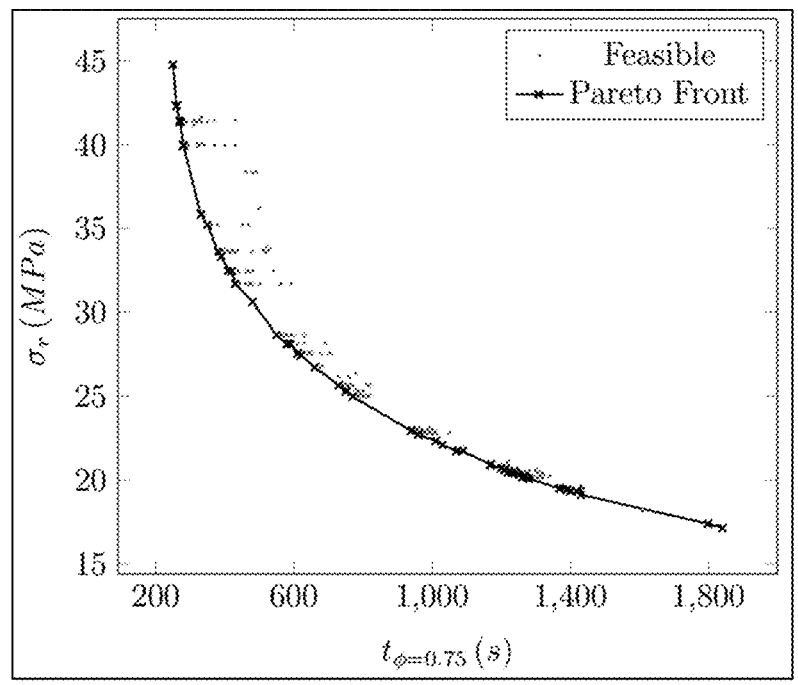
FIG. 7B depicts a graphical representation illustrating feasible points of the objective function space of cure process of FIG. 7A along with Pareto front, in accordance with an embodiment of the present disclosure.

In the present disclosure, the one or more objective functions are calculated from at least one or more output variables such as a residual stress, process time, deformation, failure index, degree of cure, total thermal energy spent on a heating process through an FEA analysis performed specific for the composite part under consideration. FIG. 7A, with reference to FIGS. 1 through 6D, depicts a graphical representation illustrating objective function space of cure process derived from FEA, in accordance with an embodiment of the present disclosure. FIG. 7B, with reference to FIGS. 1 through 7A, depicts a graphical representation illustrating feasible points of the objective function space of cure process depicted in FIG. 7A along with Pareto front, in accordance with an embodiment of the present disclosure.

At step 210 of the present disclosure, the one or more hardware processors 104 configure, using the one or more objective functions, an optimization problem to correlate the one or more input parameters and the one or more objective functions. The objective functions chosen in the current examples are same as the output response functions used in the global sensitivity analysis. As explained earlier, these two objective functions, the residual stress ($\sigma_r$) and the process time at which degree of cure reaches to 0.75 ($t_{\varnothing=0.75}$) have negative correlation. It means that these are contradictory objectives of process efficiency versus part quality for process optimization. Optimization of cure process is the selection of best input process parameters, such as heating rate, cooling rate, dwell temperature, dwell time, etc., to yield best product quality, such as low process induced deformations, defects, crack, and stress along with possible least process time. This is a multi-objective optimization problem. Increasing cure temperature causes faster degree of cure, more process induced residual stress, and inferior product quality. At lower cure temperature, degree of cure evolves slowly with lower process induced residual stress and improved product quality, but increased process time and hence the cost. There can be a compromise agreement between product quality and process cost according to the customer preferences. Accordingly, the relative weightages for the objective functions should be chosen. Many different optimization methods exist to solve the given optimization problem. Mathematical formulation of the current optimization problem for each zone of the composite part of the present disclosure is shown below by way of examples:

Minimize: $\{\sigma_r, t_{\phi=0.75}\}$

Subjected to:

$$\left.\begin{array}{c} t_{1_i} + t_{2_i} + t_{3_i} + t_{4_i} = 5400 \ (s) \\ 0.1 \ K/s \leq h_i \leq 0.25 \ K/s \\ 0.1 \ K/s \leq c_i \leq 0.25 \ K/s \\ 300 \ K \leq T_{h_i} \leq 350 \ K \\ 2500 \ s \leq t_{2_i} \leq 4200 \ s \end{array}\right\}_{i=1,2,3 \ (for \ three \ zones)}$$

At step 212 of the present disclosure, the one or more hardware processors 104 iteratively perform, for the optimization problem, an optimization technique on (i) the one or more most influencing input parameters and (ii) other parameters from the one or more input parameters based on an associated sensitivity to obtain a set of optimized process cycle parameters, until the output of the optimization technique reaches a termination criterion. In the present disclosure, the termination criterion is one of a number of maximum iterations of the optimization technique to be performed, or output of the optimization technique reaches a value associated with the one or more objective functions. The iterations of the optimization technique may be automatically determined and configured by the system 100, in one example embodiment. The iterations of the optimization technique may be configured by the system 100 via one or more user inputs, in another example embodiment.

Because of the computational cost of running simulation models, classical genetic algorithm (GA) with surrogate model embedded in the FEA analysis is used as example and implemented by the system and method of the present disclosure. Instead of running explicit micro-scale FEA analysis at each integration point of a given composite panel in semi-concurrent multiscale methods, surrogate models are used for the same material modeling thus reducing the computational time significantly. In the presented example, it is improved by 97%. GA involves converting decision variables into chromosomes and objective functions into fitness function. Then the optimizer starts with an initial population (set of decision variables) and successive decision variables are created using genetic operations such as crossover and mutation until it reaches termination criterion. The GA optimization technique involves initialization of random population (generated using random number generator). Current populations are evaluated against their fitness functions (linear weighted combination of the objective functions). The current population is then ranked according to their fitness value. Design with the lowest fitness function value (minimization problem) makes the top of the list for the current population and is selected for the reproduction. Function with the highest fitness in the bottom of the list is discarded. If the current population does not meet the termination criteria (maximum number of function evaluation) the current population is used to create new population using genetic operations of crossover and mutation.

Below, Table 4 depicts exemplary input(s) and output(s) of the optimization technique:

TABLE 4

| Input | Output |
|---|---|
| 1. Optimization technique: GA | 1. Pareto Front |
| 2. FEA setup of UD panel with mold | 2. Optimized process parameters according to different weightages of the objective functions |
| 3. Population size: 50 | |
| 4. Number of generations: 3000 | |
| 5. Objective functions | |
| 6. Constraint functions | |
| 7. Weight vector for the objective functions | |

In the present disclosure, the optimization technique carried out here is for a unidirectional (UD) panel. The whole digital process can be carried out for any structure or component having different geometrical aspects such as shape, size, thickness, stacking sequences, and the like.

FIG. 7B, with reference to FIGS. 1 through 7A, depicts a graphical representation of feasible objective function space of cure process optimization along with Pareto front, in accordance with an example embodiment of the present disclosure. Below Table 5 depicts solution of Pareto front provided by way of example for different weightages of objective functions.

TABLE 5

| Weight vectors | | Process parameters | | | | Objective functions | | Constraints |
|---|---|---|---|---|---|---|---|---|
| $w_{\sigma_r}$ | $w_{t_{\phi=0.75}}$ | h (K/s) | c (K/s) | T (K) | $t_s$(s) | $\sigma_r$ (MPa) | $t_{\phi=0.75}$(s) | t(s) |
| 1 | 0 | 0.25 | 0.14 | 347.66 | 3000.58 | 44.75 | 250 | 340 |
| 0.75 | 0.25 | 0.25 | 0.14 | 337.19 | 2740.42 | 35.85 | 330 | 560 |

TABLE 5-continued

| Weight vectors | | Process parameters | | | | Objective functions | | Constraints |
| --- | --- | --- | --- | --- | --- | --- | --- | --- |
| $w_{\sigma_r}$ | $w_{t_{\phi-0.75}}$ | h (K/s) | c (K/s) | T (K) | $t_s$(s) | $\sigma_r$ (MPa) | $t_{\phi-0.75}$(s) | t(s) |
| 0.5 | 0.5 | 0.25 | 0.14 | 327.45 | 2677.79 | 27.56 | 610 | 1200 |
| 0.25 | 0.25 | 0.12 | 0.12 | 318.25 | 2524.25 | 19.12 | 1430 | 5010 |
| 0 | 1 | 0.12 | 0.23 | 315.56 | 4103.81 | 17.14 | 1840 | 3860 |

In the present disclosure, the optimization technique is at least one of a Genetic Algorithm (GA), a particle swarm optimization technique, a differential evolution algorithm, an artificial bee colony algorithm, a covariance matrix adaptation evolution strategy algorithm, a Dividing RECTangles (DIRECT) algorithm, and a gradient-based algorithm. In the present disclosure, though the genetic algorithm is used as an optimization technique, any other optimization technique can be implemented by the system and method of the present disclosure. Such optimization technique shall not be construed as limiting the scope of the present disclosure.

Referring to steps of FIG. 2, at step 214 of the present disclosure, the one or more hardware processors 104 determine and define one or more temperature profiles using the set of optimized process cycle parameters. This optimization algorithm is run on different zones (decided by the part thickness, ply orientation, type of material, other geometrical constraints associated with the part, etc.) of the manufacturing product to generate zone specific cure temperature cycle. Temperature cure cycle depends on the point on the Pareto front. Temperature cure cycles are selected depending on the relative importance of product quality and process efficiency. Cure cycle information is sent to a master controller (e.g., the system 100) of the manufacturing setup. A single step temperature cycle is used for illustration of the method of the present disclosure. It is to be understood by a person having ordinary skill in the art or person skilled in the art that any other types of temperature cycle can also be implemented by the system and method of the present disclosure and accordingly the set of input process parameters (e.g., room temperature $T_0$(K), dwell temperature $T_h$(K), heating rate of h(K/s), and dwell time $t_2$(s)) change.

Referring to steps of FIG. 2, at step 216 of the present disclosure, the one or more hardware processors 104 generate/manufacture a molded part using the composite material based on the one or more determined temperature profiles. In other words, the simulation steps from 202 till 214 further enable the system 100 to manufacture molded part using the composite material based on the one or more determined temperature profiles. FIG. 8, with reference to FIGS. 1 through 7B, depicts an automated manufacturing setup in multiple zones arrangement for manufacturing/generating the molded part using the composite material based on the one or more optimized temperature profiles. More specifically, FIG. 8 depicts an automated manufacturing setup with multiple zones arrangement for manufacturing/generating the molded part using the composite material based on the one or more determined temperature profiles determined by configuring the finite element analysis for the same manufacturing setup and then iteratively performing an optimization technique, in accordance with an embodiment of the present disclosure. The above step 216 is better understood by way of the following description:

Composites are manufactured using molds and are then cured by application of heat. For manufacturing many complicated shapes of components, molds are being made with fiber reinforced composites infused with tooling resin having high glass transition temperature and low coefficient of thermal expansion which increases longevity and operating temperature range of the manufacturing setup of the composite part. The mold can have in-built heating elements so that the additional need of separate heating oven can be avoided. The heated mold is made by creating multiple heating zones (refer description of step 208 of FIG. 2 wherein zones are described) inside the composite mold as shown in FIG. 8. The heating elements and thermocouples are embedded between two layers of the mold. The arrangement of the heating elements, design of these layers and material selection are finalized as per the part shape, size and the material used as well as their cure temperature. The heating elements are placed in such a way that the overall consumption of energy can be reduced, and that the composite part is produced in shortest possible time with required quality. Thus, the design and location of the heating elements are directly connected to the manufacturing process optimization based on cure kinetics of the resin. In the manufacturing setup, by the system and method of the present disclosure, the mold is heated by providing electric current through a resistance wire. Alternatively, heating and/or cooling can be done by circulating water (hot as well as chilled) from water bath maintained at certain temperature. The desired temperature can be achieved by either varying the length of the resistance wire or by varying the voltage applied by using a variable voltage auto-transformer (Dimmer Stats). Resistance wires made of Nichrome and of size 28 AG ($\phi$ 0.32 mm) are used in the manufacturing performed by the system and method of the present disclosure. The resistance in the wire (about 0.01343 Ω·cir mil/mm) heats the mold and provides the heat necessary for the manufacturing process. A certain amount of voltage should be maintained to let enough current pass through the wire to heat up the mold. The temperature of the mold is obtained by a thermocouple, which is monitored by a controller. The length of the wire and voltage to be applied are calculated by using the following Equations (2) and (3).

$$I = \frac{V}{R} \quad (2)$$

$$R = \left(\frac{R}{Cir.\text{Area} \times \text{mm}}\right) \times Cir.\text{Area} \times \text{length} \quad (3)$$

To initiate the manufacturing process, the mold is cleaned, and a layer of release agent is applied for the smooth removal of the part. Fibers are cut according to part size and laid in proper orientation and stack up sequence. The resin is mixed with an appropriate quantity of hardener and accelerator at an elevated temperature in a magnetic stirrer. The mixture is then degasified by applying vacuum. The fiber layers are then bagged inside the mold and the resin is transferred into the bag by applying vacuum inside. The mold is divided into various zones, each controlled by a separate controller which controls the power supply to the resistance wire in that zone with the help of feedback from the thermocouple measuring the mold temperature in that zone. The controllers of the different zones are controlled by a master controller, which can be monitored from a platform built to handle this process. Cure cycle of each zone is also depicted in FIG. 8. The temperature cycle of each zone is computed through optimization and multi-scale analysis. The panel is heated from an initial temperature $T_0(K)$ to a dwell temperature $T_h(K)$ at a heating rate of h (K/s) in time $t_1(s)$. Then the temperature is maintained for duration $t_2(s)$. The panel is then cooled to the room temperature by forced or natural cooling at a rate of c (K/s) in time $t_3(s)$ followed by maintaining the panel at room temperature for a duration of $t_4(s)$. The temperature profiles are fed to the controller with the set temperature as $T_h(K)$, ramp time as $t_1(s)$ (so that heating rate h(K/s) is maintained), followed by, holding time $t_2(s)$. The whole setup was calibrated to ensure that the exact temperature is maintained across the setup. Below description provides exemplary monitoring and controlling of manufacturing process.

Monitoring and Controlling of Manufacturing Process:

The temperature of the mold is controlled by a proportional-integral-derivative (PID) controller. Initially the mold is at room temperature. Then, the mold is heated to the desired temperature $T_h(K)$ at the heating rate, h(K/s). The heating is provided by electric current passing through the resistance wire made of Nichrome. The rate of heating is provided by the PID controller based on the difference between present value and set value. The controller action is governed by Equation (4).

$$C_v = K_P E + K_i \int_{t=0}^{t} E dt + K_d \frac{dE}{dt} \tag{4}$$

where $C_v$ is controlled temperature, $K_p$ is proportional gain, E is the error (difference between present value and set value), $K_i$ is integral gain, t is time and $K_d$ is differential gain. The first term $K_p E$, adds heat based on the proportional difference between set value (given by the model) and present value (recorded by thermocouple). The second term, integral term $K_i \int_{t=0}^{t} E dt$, removes bias or sustained error in the temperature value for better temperature control. The third, differential term $$K_d \frac{dE}{dt},$$

helps in addressing the requirement of achieving the required heating rate. When the set value is higher than the present value and the system needs to be heated up at a rate of h(K/s), the controller adds the heat depending on the differential error with respect to time, until the set temperature $T_h(K)$ is achieved. Further to this, the temperature is maintained at $T_h(K)$ by sensing the actual mold temperature and compensating for any temperature drop due to heat losses with time, through the linear and integral component of the equation (4). All three control parameters are manually tuned to minimize the response time, overshoot, oscillations, steady-state errors of the controller so that the temperature of the mold in various zones can be controlled more accurately with quick response and minimum corrective actions.

Thus, the composite material panel can be manufactured, by monitoring and controlling the process through the master controller, with optimized process parameters according to the user mentioned multiple quality criteria. The whole digital process helps manufacturers to make the composite products with simple and efficient use of the limited resources available to them. The present disclosure and its systems and methods were executed for manufacturing of molded parts through VARTM (Vacuum Assisted Resin Transfer Molding) and controlled through PID controllers and thermocouples. The same can be done through any other manufacturing process and equipment also and such experimental setup shall not be construed as limiting the scope of the present disclosure.

The present disclosure provides a processor implemented simulation system and method for manufacturing of components made up of reinforced polymer composite materials. More specifically, the system and method implement multiscale analysis to reduce the dependency on expensive physical experiments. Further, such implementation of simulation driven approach through virtual testing makes it more versatile and accurate when compared to analytical or empirical methods. Furthermore, the generation of surrogate models using the DoE and utilizing the surrogate model(s) for multiscale method makes the whole digital process more efficient computationally and makes it possible to use multiscale approach in optimization process, thus reducing the requirement of computational resources. Moreover, the system and method of the present disclosure enable development of knowledge of the composite material and the manufacturing process through the analytics of generated computational data.

System and method of the present disclosure implement various techniques for designing and manufacturing components (or molded parts) made up of composite materials. Traditionally, components made up of composite materials were designed by designers and are then manufactured to the specification by the manufacturers. The designer must choose optimal margins of error by considering uncertainty in the manufacturing process as well as the materials supplied. System and method of the present disclosure integrate design, manufacturing, and materials domain (carried out in silos at present in the industries) and enable extracting a combined knowledge through explicitly capturing all the trends and sensitivities digitally. Further, the present disclosure enables integration of various stake holders such as material suppliers, mold designers and manufacturers, part manufacturers, product designers and end-users and the workflow as described in the present disclosure enables to take informed decisions based on other stakeholders' work and requirement in a simple way with minimal expertise in others' domain. Furthermore, in the conventional approaches the manufacturer of the components made up of composite material, defines the quality of the product based on the deviations in the geometry (such as warpage i.e., deviation from the required geometry) whereas in the present disclosure, quality of the end product is defined digitally in terms of internal residual stresses, strains, damage as well as deformation, through virtual tests and computational framework. Method of the present disclosure, when executed, enables correlation of the quality (in above said terms) of the product with the design of the component (ply stack-up, ply orientation, ply thickness, ply drop off, etc.), manufacturing process (various process parameters), material selection and design (microstructure evolution). The digital monitoring and controlling of the optimal process parameters obtained through this methodology also helps to analyze the total process time and power consumption thus helping in cost optimization (e.g., refer FIG. 8). In the conventional approaches, any variability in materials, design and process parameters demand for experimental characterization which is very expensive and time consuming. The method and system of the present disclosure implement multiscale framework, virtual testing (computational simulations) and generation of surrogate models which help to minimize the cost and time. It also allows to study the effect of input parameters on the end product as well as the contradiction between various objectives of optimization. Also, the integration between materials, design and manufacturing, shown here through the approach, can give various insights such as the effect of volume fraction or orientation of fibers on residual stress, effect of curvature of the part on the deformation after cure, etc. These structured knowledge features are gathered in the form of surrogate models and correlation matrix which can be used to accelerate, automate and reduce excessive dependence on informal decision making by expert(s).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented simulation method for manufacturing molded parts using composite materials, comprising:

obtaining one or more input parameters through design of experiments (DoE) that is specific to a composite material made of a fibre reinforcement embedded with a polymer material, wherein the design of experiments (DoE) comprises a correlation between the one or more input parameters and one or more corresponding output parameters;

generating a machine learning (ML) model using the design of experiments (DoE);

performing a global sensitivity analysis on the design of experiments (DoE) to identify one or more most influencing parameters from the one or more input parameters of the design of experiments, wherein the most influencing input parameters comprises at least one of dwell temperature and dwell time;

configuring a finite element analysis (FEA) with the ML model embedded within the FEA for material modeling using (i) the most influencing input parameters and (ii) other parameters from the one or more input parameters based on an associated sensitivity to derive one or more output variables, wherein one or more objective functions are determined from the one or more output variables, wherein the associated sensitivity of the one or more input parameters is derived by ranking of the one or more input parameters based on a correlation coefficient value obtained by the global sensitivity analysis, and wherein the other parameters m rises at least one of a heating rate, a cooling rate, a number of sampling points, and a sampling method;

configuring, using the one or more objective functions, an optimization problem to correlate the one or more input parameters and the one or more objective functions;

iteratively performing, for the optimization problem, an optimization technique on (i) the one or more most influencing input parameters and (ii) other parameters from the one or more input parameters based on the associated sensitivity to obtain a set of optimized process cycle parameters, until a termination criterion is reached, wherein one or more geometrical constraints of a molded part to be manufactured using the composite material is used in the optimization technique such that the molded part is divided into a plurality of zones based on the one or more geometrical constraints and the optimization technique is performed individually for each zone of the plurality of zones of the molded part for optimizing (i) the one or more most influencing input parameters and (ii) the other parameters from the one or more input parameters;

determining and defining one or more temperature profiles using the set of optimized process cycle parameters, wherein the one or more determined temperature profiles comprises at least cure temperature cycle information corresponding to each zone of the plurality of zones of the molded part;

transferring the one or more determined temperature profiles to a master controller for the manufacturing of the molded part and controlling a plurality of controllers by the master controller, each of the plurality of controllers controlling one or more control parameters of at least one zone of the plurality of zones of the molded part; and manufacturing the molded part, by the master controller, using the composite material based on the one or more determined temperature profiles.

2. The processor implemented simulation method of claim 1, wherein the one or more objective functions comprise at least one of a residual stress, a process time, deformation, failure index, degree of cure, total thermal energy spent on a heating process.

3. The processor implemented simulation method of claim 1, wherein the termination criterion is one of a number of maximum iterations of the optimization technique to be performed, or output of the optimization technique reaches a value associated with the one or more objective functions.

4. The processor implemented simulation method of claim 1, wherein the optimization technique is at least one of a Genetic Algorithm (GA), a particle swarm optimization technique, a differential evolution algorithm, an artificial bee colony algorithm, a covariance matrix adaptation evolution strategy algorithm, a DIviding RECTangles (DIRECT) algorithm, and a gradient-based algorithm.

5. A processor implemented simulation system for manufacturing molded parts using composite materials, comprising:
a memory storing instructions;
one or more communication interfaces; and
one or more hardware processors coupled to the memory via the one or more communication interfaces, wherein the one or more hardware processors are configured by the instructions to:

obtain one or more input parameters through design of experiments (DoE) that is specific to a composite material made of a fibre reinforcement embedded with a polymer material, wherein the design of experiments (DoE) comprises a correlation between the one or more input parameters and one or more corresponding output parameters;

generate a machine learning (ML) model using the design of experiments (DoE);

perform a global sensitivity analysis on the design of experiments (DoE) to identify one or more most influencing parameters from the one or more input parameters of the design of experiments, wherein the most influencing input parameters comprises at least one of dwell temperature and dwell time;

configure a finite element analysis (FEA) with the ML model embedded within the FEA for material modeling using (i) the most influencing input parameters and (ii) other parameters from the one or more input parameters based on an associated sensitivity to derive one or more output variables, wherein one or more objective functions are determined from the one or more output variables, wherein the associated sensitivity of the one or more input parameters is derived by ranking of the input parameters based on a correlation coefficient value obtained by the global sensitivity analysis, and wherein the other parameters comprises at least one of a heating rate, a cooling rate, a number of sampling points, and a sampling method;

configure, using the one or more objective functions, an optimization problem to correlate the one or more input parameters and the one or more objective functions;

iteratively perform, for the optimization problem, an optimization technique on (i) the one or more most influencing input parameters and (ii) other parameters from the one or more input parameters based on the associated sensitivity to obtain a set of optimized process cycle parameters, until a termination criterion is reached, wherein one or more geometrical constraints of a molded part to be manufactured using the composite material is used in the optimization technique such that the molded part is divided into a plurality of zones based on the one or more geometrical constraints and the optimization technique is performed individually for each zone of the plurality of zones of the molded part for the optimization of (i) the one or more most influencing input parameters and (ii) the other parameters from the one or more input parameters;

determine and define one or more temperature profiles using the set of optimized process cycle parameters, wherein the one or more determined temperature profiles comprises at least cure temperature cycle information corresponding to each zone of the plurality of zones of the molded part;

transfer the one or more determined temperature profiles to a master controller for the manufacturing of the molded part and control a plurality of controllers by the master controller, each of the plurality of controllers configured to control one or more control parameters of at least one zone of the plurality of zones of the molded part; and manufacture the molded part, by the master controller, using the composite material based on the one or more determined temperature profiles.

6. The processor implemented simulation system of claim 5, wherein the one or more objective functions comprise at least one of a residual stress, a process time, deformation, failure index, degree of cure, total thermal energy spent on a heating process.

7. The processor implemented simulation system of claim 5, the termination criterion is one of a number of maximum iterations of the optimization technique to be performed, or output of the optimization technique reaches a value associated with the one or more objective functions.

8. The processor implemented simulation system of claim 5, wherein the optimization technique is at least one of a Genetic Algorithm (GA), a particle swarm optimization technique, a differential evolution algorithm, an artificial bee colony algorithm, a covariance matrix adaptation evolution strategy algorithm, a DIviding RECTangles (DIRECT) algorithm, and a gradient-based algorithm.

9. A computer program product comprising a non-transitory computer readable medium having a computer readable program embodied therein, wherein the computer readable program, when executed on a computing device causes the computing device to manufacture molded parts using composite materials by:
obtaining one or more input parameters through design of experiments (DoE) that is specific to a composite material made of a fibre reinforcement embedded with a polymer material, wherein the design of experiments (DoE) comprises a correlation between the one or more input parameters and one or more corresponding output parameters;
generating a machine learning (ML) model using the design of experiments (DoE);
performing a global sensitivity analysis on the design of experiments to identify one or more most influencing parameters from the one or more input parameters of the design of experiments (DoE), wherein the most influencing input parameters comprises at least one of dwell temperature and dwell time;
configuring a finite element analysis (FEA) with the ML model embedded within the FEA for material modeling using (i) the most influencing input parameters and (ii) other parameters from the one or more input parameters based on an associated sensitivity to derive one or more output variables, wherein one or more objective functions are determined from the one or more output variables, wherein the associated sensitivity of the one or more input parameters based on a correlation coefficient value obtained by the global sensitivity analysis, and wherein the other parameters comprises at least one of a heating rate, a cooling rate, a number of sampling points, and a sampling method;
configuring, using the one or more objective functions, an optimization problem to correlate the one or more input parameters and the one or more objective functions;
iteratively performing, for the optimization problem, an optimization technique on (i) the one or more most influencing input parameters and (ii) other parameters from the one or more input parameters based on the associated sensitivity to obtain a set of optimized process cycle parameters, until output of the optimization technique reaches a termination criterion, wherein one or more geometrical constraints of a molded part to be manufactured using the composite material is used in the optimization technique such that the molded part is divided into a plurality of zones based on the one or more geometrical constraints and the optimization technique is performed individually for each zone of the plurality of zones of the molded part for optimizing (i) the one or more most influencing input parameters and (ii) the other parameters from the one or more input parameters;
determining and defining one or more temperature profiles using the set of optimized process cycle parameters, wherein the one or more determined temperature profiles comprises at least cure temperature cycle information corresponding to each zone of the plurality of zones of the molded part;
transferring the one or more determined temperature profiles to a master controller for the manufacturing of the molded part and controlling a plurality of controllers by the master controller, each of the plurality of controllers controlling one or more control parameters of at least one zone of the plurality of zones of the molded part; and
manufacturing the molded part, by the master controller, using the composite material based on the one or more determined temperature profiles.

10. The computer program product comprising a non-transitory computer readable medium of claim 9, wherein the one or more objective functions comprise at least one of a residual stress, a process time, deformation, failure index, degree of cure, total thermal energy spent on a heating process.

11. The computer program product comprising a non-transitory computer readable medium of claim 9, wherein the termination criterion is one of a number of maximum iterations of the optimization technique to be performed, or output of the optimization technique reaches a value associated with the one or more objective functions.

12. The computer program product comprising a non-transitory computer readable medium of claim 9, wherein the optimization technique is at least one of a Genetic Algorithm (GA), a particle swarm optimization technique, a differential evolution algorithm, an artificial bee colony algorithm, a covariance matrix adaptation evolution strategy algorithm, a DIviding RECTangles (DIRECT) algorithm, and a gradient-based algorithm.

* * * * *